No. 831,117. PATENTED SEPT. 18, 1906.
S. STEVENS.
EYEGLASSES.
APPLICATION FILED DEC. 21, 1905.
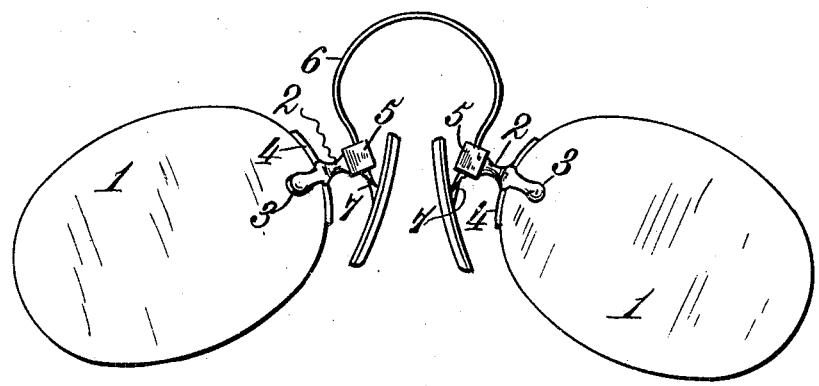
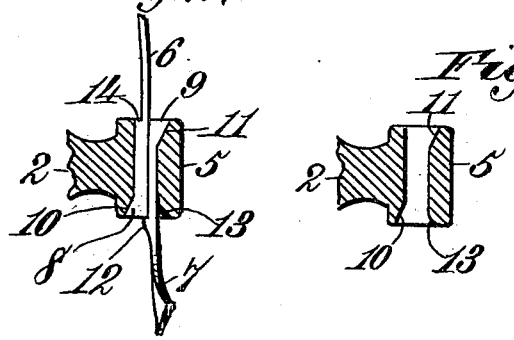
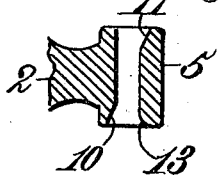
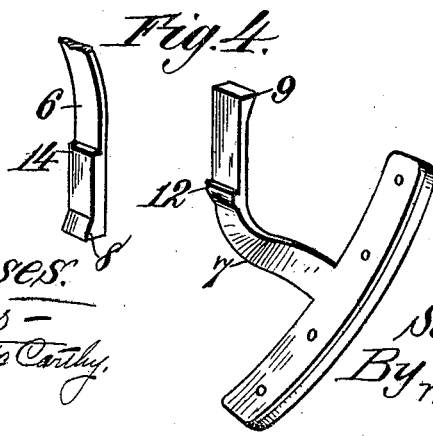
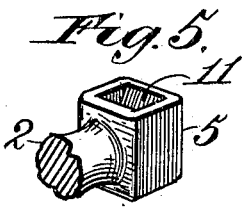
Witnesses:
Inventor
Seriah Stevens.
By Meyers, Cushman & Rea,
Attorneys.

UNITED STATES PATENT OFFICE.

SERIAH STEVENS, OF BOSTON, MASSACHUSETTS.

EYEGLASSES.

No. 831,117.  Specification of Letters Patent.  Patented Sept. 18, 1906.

Application filed December 21, 1905. Serial No. 292,716.

*To all whom it may concern:*

Be it known that I, SERIAH STEVENS, a citizen of the United States, residing at Boston, in the county of Suffolk and State of Massachusetts, have invented new and useful Improvements in Eyeglasses, of which the following is a specification.

My invention relates to improvements in eyeglasses, and has for its object to provide a new, simple, and effective means for and manner of connecting the bow-spring and nose-guard with the lenses, avoiding the objections incident to the utilization of a screw for this purpose.

It is the common practice to secure the bow-spring and nose-guards of eyeglasses in the lens-posts by means of small screws. The screws soon and frequently work loose, rendering the support for the lenses loose and insecure, with the result that the proper position of the lenses becomes disturbed, and frequently the screws work entirely out and become lost, to the great inconvenience of the user and requiring that the glasses be frequently sent to an oculist for repair and adjustment. The difficulties attending the use of screws for the purpose described are well recognized in the art and by users of glasses; but notwithstanding this the use of such screws is generally continued for want of a better means of connection; and so far as I am aware no different means have been provided prior to my invention to adequately take the place of the screws and obviate the objections and difficulties referred to.

With the foregoing object in view my invention consists in an eyeglass having the features hereinafter described and shown and in the several novel parts and arrangement thereof.

That which is regarded as new will be set forth in the clauses of claim appended to the description.

In the accompanying drawings, illustrating, as the statute requires, that which I regard as the best-known embodiment of my invention, Figure 1 is a front elevation of a pair of eyeglasses constructed according to the invention; Fig. 2, a section through the end of the lens-post, showing the connection of the bow-spring and nose-guard; Fig. 3, a similar view of the end of the lens-post before the bow-spring and nose-guard have been assembled therein. Fig. 4 shows the attaching end of the bow-spring and the nose-guard in perspective; Fig. 5, a perspective of the end of the post.

As stated, the said drawings illustrate what I regard as the best-known embodiment of my invention as to the form and particular arrangement of parts, and this preferred or best-known embodiment will therefore be described without, however, intending by such particularity of description to restrict my invention or the clauses of claim to such form and arrangement, except in so far as the same may be expressly stated in some one or more clauses of claim, and then only for the purposes of those particular clauses.

In the said drawings the reference-number 1 designates the lenses of the eyeglass, and 2 the lens-post, which when the lenses are rimless may be provided with the usual clamping-jaws and brace-arms, such as indicated by the numerals 3 and 4 in the drawings, and when the glasses are rimmed may be formed integral with or attached to the rims. As my invention does not concern the means of attaching the lenses to the post, it will be understood that any suitable means for this purpose may be employed.

The post is provided at its free end with a loop 5 to receive the ends of the bow-spring 6 and nose-guard arm 7, the latter, as usual, being of springy material, so that the nose-guard will engage the nose with a comfortable yielding pressure, and for another purpose which will be referred to. The end of the bow-spring and the nose-guard arm that meet within the loop are provided with shoulders that are fashioned as oppositely-disposed wedges 8 and 9. These shouldered ends are arranged across the line of direction of insertion and withdrawal of the bow-spring and nose-guard into and from the loop, and together constitute a mass of greater cross-sectional dimension than the cross-sectional area of the passage through the loop. Consequently they cannot pass each other within the loop. It is only, therefore, by going through in reverse order the operation performed in assembling the parts, as hereinafter described, that separation can take place. In the illustrated example of my invention the shouldered ends 8 and 9 face toward and coöperate with counterpart shoulders 10 and 11 of the walls of the loop 5.

The ends of the bow-spring and nose-guard are maintained firmly in the described assembled position within the loop upon the completion of the act of assembling. Preferably, and as shown, this is accomplished automatically and by means of a keeper 12, with which one of said parts is provided. This keeper is shown as a shoulder outside the loop on one part, that engages against the end of the other part, as illustrated in Fig. 2, thus interlocking said parts, so that it is accessible for manipulation when it is desired to disconnect any of the parts, and in use this arrangement prevents any disturbance of the assembled relation of the bow-spring and nose-guard within the loop 5.

In assembling the parts or making the connection the ends of the bow-spring and nose-guard arms are passed one at a time through the loop from opposite directions and their shouldered or wedge ends passed clear beyond the loop, after which said ends are drawn into the loop one at a time and are then driven home, and the keeper or lock with which one of said parts is provided automatically snaps over and engages the end of the other member. If occasion necessitates, the parts may be as readily disconnected by slightly springing one of the parts—in the illustrated example the nose-guard arm—away from the shouldered or wedge end of the other to withdraw the keeper from engagement therewith, whereupon by moving the parts in proper direction the connection may be loosened and said parts removed from the box one at a time, as in assembling. If desired, one edge of one wall of the loop adjacent the location of the keeper may be slightly cut away, as at 13, to facilitate the withdrawal of said keeper in order to permit the connection to be separated.

To enable the ends of the bow-spring and nose-guard arm to be passed through the loop as described and yet fill out the loop when assembled, said parts are provided with a filler 14, which preferably and as shown is formed upon the bow-spring. The filler is passed clear through and beyond the loop in the act of assembling or disconnecting the parts in order that they may be inserted one at a time into or withdrawn from the loop.

I have illustrated and herein described, as the statute requires, the best-known embodiment of my invention in connection with the use to which it is particularly intended. In the broader aspects of the invention, however, I desire to be understood as not restricting the same to its use in connection with eyeglasses, but claim it for all the uses for which it is adapted, and therefore to be more comprehensive in the following claims the term "element" is used to designate the post 2 or the corresponding part in any connecting means, and the word "members" designates the bow-spring and nose-guard or other parts to be connected to said element.

Having thus described my invention, what I claim as new, and desire to secure by Letters Patent, is—

1. In a coupling means, the combination of an element having a loop, of members adapted to be arranged in said loop and provided with shouldered ends, said ends constituting, together, a mass of greater cross-sectional dimensions than the cross-sectional area of the passage through the loop and means for maintaining said ends in said loop.

2. In a coupling means, the combination of an element having a loop, of members adapted to be arranged in said loop and provided with shouldered ends, said ends constituting, together, a mass of greater cross-sectional dimensions than the cross-sectional area of the passage through the loop, and automatic means for maintaining said ends in said loop.

3. In a connecting means, the combination of an element having a loop, of members to be connected to said element having shouldered ends adapted to be arranged in said loop, said shouldered ends together constituting a mass of greater cross-sectional dimensions than the cross-sectional area of the passage through the loop, and a keeper carried by one of said members adapted to engage the other member and maintain the position of said members in said loop.

4. In a connecting means, the combination with an element provided with a shouldered loop, of members to be connected to said element having ends adapted to be arranged in said loop and provided with shoulders to engage the shoulders of the loop, and means for maintaining the position of said members in said loop.

5. In a connecting means, the combination with an element provided with a shouldered loop, of members to be connected to said element having ends adapted to be arranged in said loop, and provided with shoulders to engage the shoulders of the loop, and means carried by one of said members to engage the other thereof to maintain the position of said members in said loop.

6. In an eyeglass, the combination of a lens-post provided with a loop, of bow-spring and nose-guard members having shouldered ends adapted to be arranged in said loop, said shouldered ends together constituting a mass of cross-sectional dimensions greater than the cross-sectional area of the passage through the loop, and means carried by one of said members for engaging the other thereof to maintain the position of said members in said loop.

7. In an eyeglass, the combination of a lens-post provided with a shouldered loop, of bow-spring and nose-guard members having shouldered ends adapted to be arranged in said loop, said shouldered ends together constituting a mass of greater cross-sectional dimensions than the cross-sectional area of the passage through the loop, and means carried by one of said members for engaging the other thereof to maintain the position of the members in the loop.

8. In an eyeglass, the combination of a lens-post provided with a shouldered loop, of bow-spring and nose-guard members having shouldered ends adapted to be arranged in said loop, said shouldered ends together constituting a mass of greater cross-sectional dimensions than the cross-sectional area of the passage through the loop, means carried by one of said members for engaging the other thereof to maintain the position of the members in the loop, and a filler combined with said members to fill out the passage in the loop when the said members are assembled therein.

In testimony whereof I have hereunto set my hand in presence of two subscribing witnesses.

SERIAH STEVENS.

Witnesses:
    GEO. W. REA,
    GERTRUDE M. STUCKER.